May 29, 1962   C. F. KING, JR., ETAL   3,036,872
BEARING LOCK
Filed Feb. 1, 1960   3 Sheets-Sheet 3
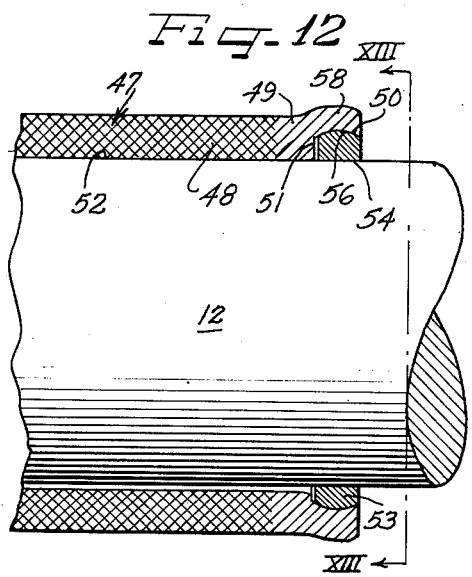
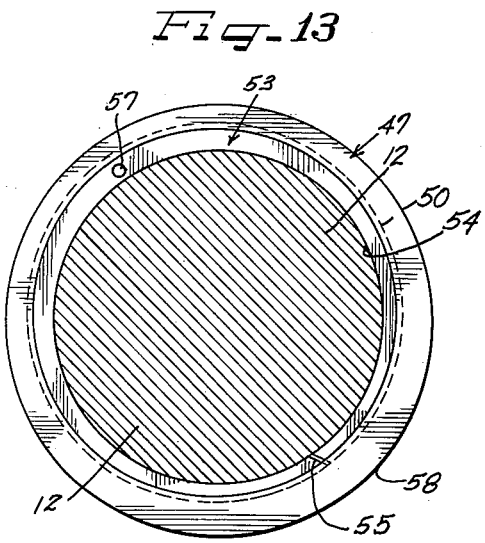
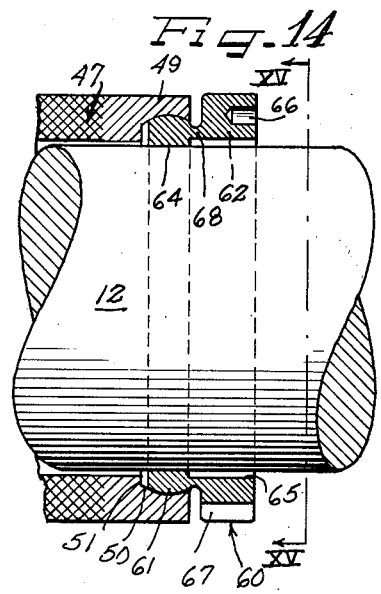
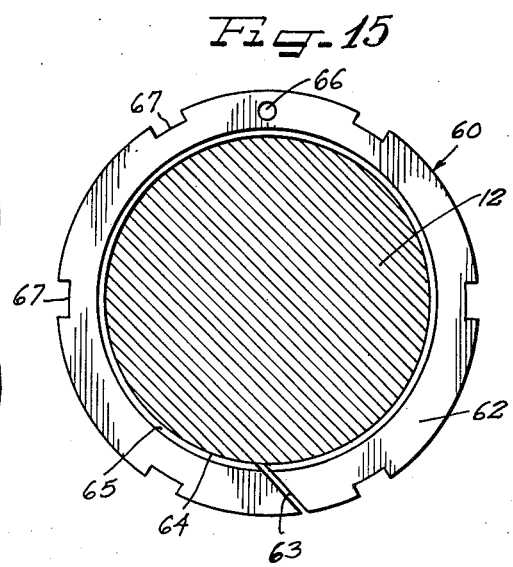
Inventors
Carl F. King, Jr.
Donald C. Schroeder

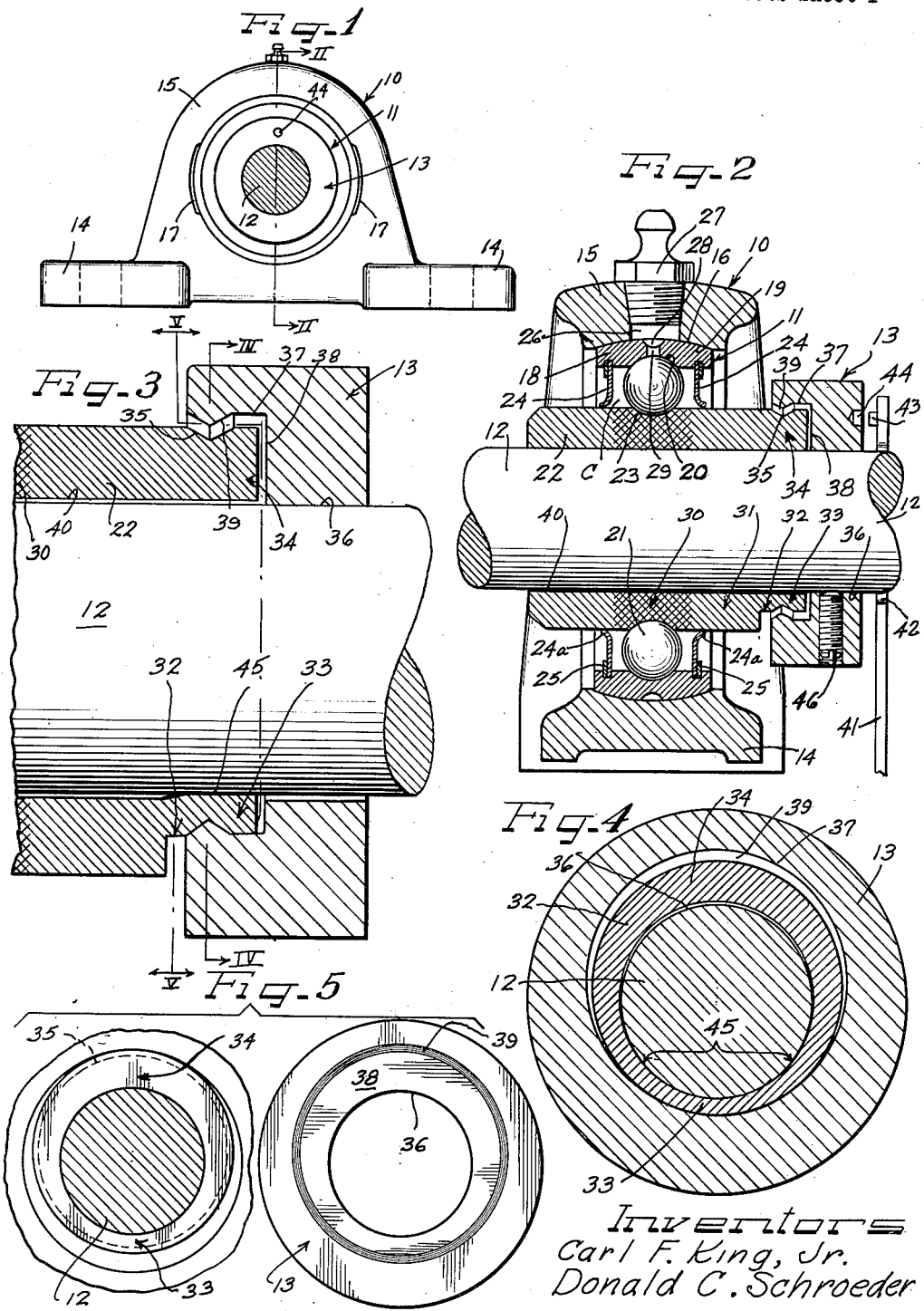

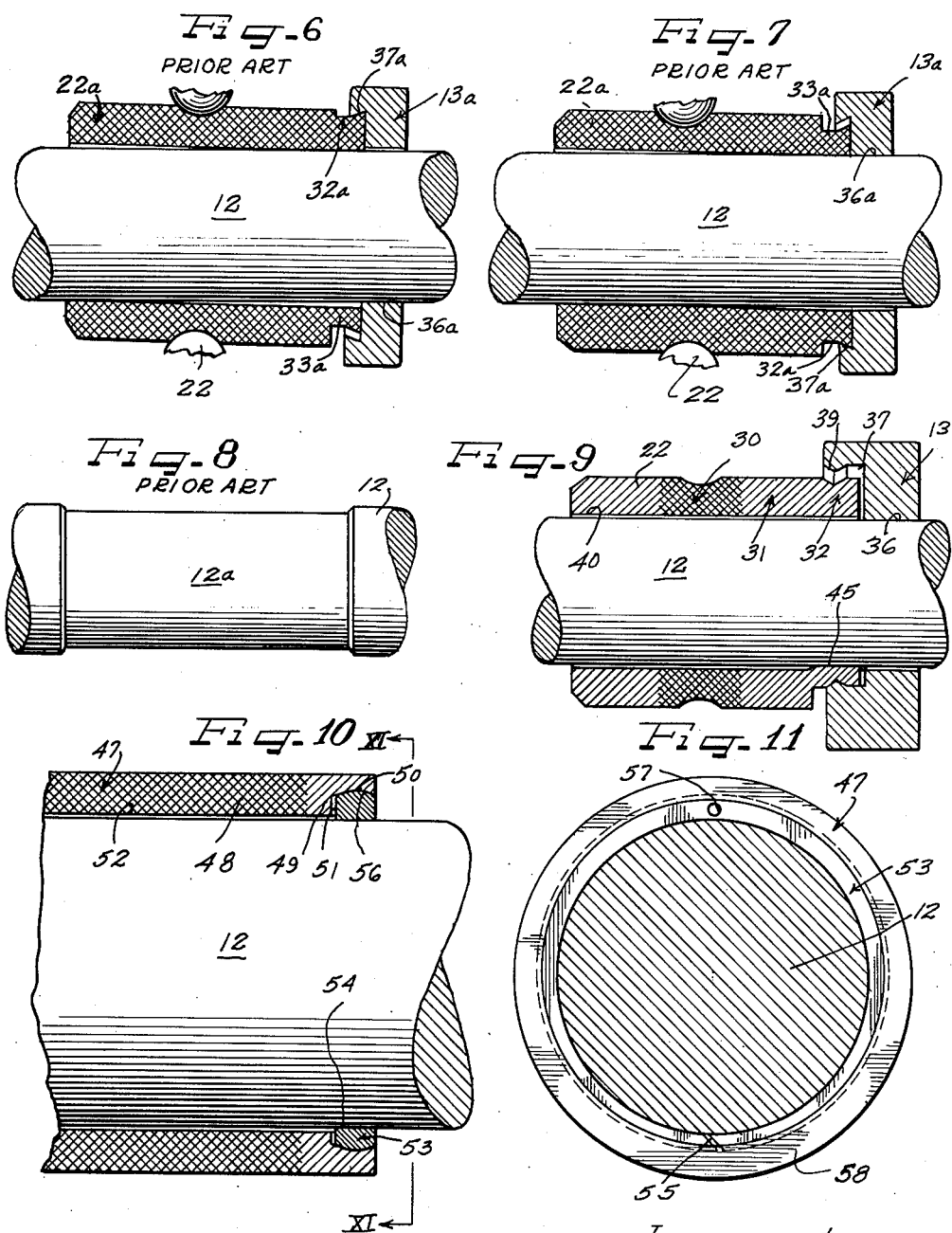

United States Patent Office 3,036,872
Patented May 29, 1962

3,036,872
BEARING LOCK
Carl F. King, Jr., Aurora, and Donald C. Schroeder, Oswego, Ill., assignors, by mesne assignments, to Olin J. Shafer, Park Ridge, Ill.
Filed Feb. 1, 1960, Ser. No. 5,729
14 Claims. (Cl. 308—236)

This invention relates to locks for securing the inner race ring of a bearing to a shaft supported by the bearing. Specifically this invention relates to a self-locking collar and an inner race ring of a bearing having a deformable end portion engaged by the collar for clamped engagement with a shaft extended through the inner race ring.

It has been customary in the bearing industry to provide through hardened inner race rings for the bearings with extended ends receiving locking collars in cammed engagement therewith for securing the inner race rings to shafts extended therethrough. The camming action of the locking collar on such through hardened race rings causes the race rings to cock or tilt on the shaft. Then as the cocked or tilted race ring is rotated with the shaft, it tends to rock relative to the shaft causing what is known in the industry as fretting corrosion between the race ring and the shaft and producing a red dust. The shaft soon wears down under the simulated lathe cutting action of the race ring as it rocks. The shaft soon becomes weakened and excessively undersized so that any new bearing assembly having a race ring large enough to slide over the full diameter portion of the shaft will be too large for operation at the reduced diameter portion of the shaft.

In accordance with this invention the extended locking collar receiving end of the inner race ring is made sufficiently soft and ductile so that it will be locally deformed by the locking collar into tight gripping engagement with the shaft without ever tilting or cocking the race ring. In one embodiment of the invention the inner race ring of the bearing is only locally hardened at the ball race portion thereof for resisting wear. The ball race portion is thus embedded in a main body which is maintained soft and deformable. In another arrangement the inner race ring is hardened throughout and then the collar receiving extended end portion is annealed to a softened ductile condition capable of locally deforming under the camming action of the locking collar without stressing the hardened portion or main body of the race ring.

In one embodiment of this invention the locking collar is externally mounted on an eccentric softened extended end of the race ring. In another embodiment the extended softened end of the race ring is counterbored to receive an internal locking collar.

Both the internal and external locking collars of this invention are cranked or cammed into wedge fitting engagement with the race ring and shaft by a simple spanner wrench having a lug fitted in a recess in an end face of the collar and a jaw that is rocked over the shaft. If desired the external locking collar can be equipped with a set screw that bites into the shaft to prevent reverse rotation of the locking collar after it has been cranked into cam locking position. However, since the cam lock is tightened when the collar moves in the direction of rotation of the shaft, the set screw is usually not necessary. In the internally mounted embodiment of the locking collar, the collar is split and resiliently expansible into its eccentric seat in the race ring and no set screw lock is needed.

It is then an object of this invention to provide a cam lock for the inner race rings of bearing assemblies which acts on a locally deformable extended end portion of the race ring to wedge lock this portion into engagement with the shaft extended through the race ring.

Another object of this invention is to provide a locking collar and a cooperating deformable eccentric end on an inner bearing ring for cam locking the ring to a shaft supported by the bearing.

A still further object of this invention is to provide bearing assemblies with inner race rings having extended deformable cam locking ends.

A still further object of this invention is to provide a bearing race ring with a locally hardened ball race and an extended ductile eccentric end for coaction with an eccentric locking collar.

A still further object of this invention is to provide a bearing and cam lock assembly which does not result in a cocking or tilting of the bearing race ring.

A specific object of this invention is to provide an internal cam lock for bearing race rings.

Another specific object of the invention is to provide a bearing race ring with a ductile internally counterbored cam lock end portion.

Another object of the invention is to provide a split internal cam lock ring for wedging a bearing race ring into clamped engagement wtih a shaft carried by the race ring.

Other and further objects of this invention will be apparent to those skilled in this art from the following detailed description of the annexed sheets of drawings which, by way of preferred examples only illustrate two embodiments of the invention.

On the drawings:

FIGURE 1 is a side elevational view of a pillow block bearing assembly supporting a shaft and equipped with an external locking collar for clamping the inner race ring of the bearing to the shaft in accordance with this invention;

FIGURE 2 is an enlarged vertical cross sectional view taken substantially along the line II—II of FIG. 1;

FIGURE 3 is a greatly enlarged fragmental cross sectional view of the locking collar and of the bearing assembly of FIG. 2 and showing the parts rotated 90° from the position of FIG. 2;

FIGURE 4 is a vertical cross sectional view along the line IV—IV of FIG. 3;

FIGURE 5 are opposite face views along the line V—V of FIG. 3;

FIGURE 6 is a fragmentary longitudinal cross sectional view of a conventional through hardened inner race ring and locking collar arrangement showing the manner in which the inner race ring is cocked or tilted on the shaft;

FIGURE 7 is a view similar to FIG. 6 but rotated 180° from FIG. 6;

FIGURE 8 is an elevational view of a portion of a shaft carried by the inner race ring of the prior art showing the manner in which the shaft is worn down by the continued rocking of the race ring on the shaft;

FIGURE 9 is a view similar to FIG. 6 but illustrating the manner in which the ductile end of the inner race ring of this invention is deformed by the locking collar without cocking or tilting of the race ring;

FIGURE 10 is a fragmentary vertical cross sectional view, with a part in elevation, of an inner race ring with an internally grooved ductile end having therein, in an unlocked position, the internal locking collar version of this invention;

FIGURE 11 is an end elevational view along the line XI—XI of FIG. 10;

FIGURE 12 is a view similar to FIG. 10 but showing the locking collar in locked position;

FIGURE 13 is an end elevational view along the line XIII—XIII of FIG. 12;

FIGURE 14 is a cross-sectional view of another form of internal locking collar according to this invention mounted on a shaft and inner race ring assembly in unlocked position; and FIGURE 15 is an end elevational view along the line XV—XV of FIG. 14.

As shown on the drawings:

In FIGS. 1 and 2 the reference numeral 10 designates generally a pillow block housing carrying a sealed bearing unit 11 which rotatably supports a shaft 12 that is cam locked to the inner race ring of the bearing assembly by a locking collar 13.

The pillow block 10 has laterally extending feet 14, 14 with holes therethrough to receive mounting bolts for securing the housing to a base. An annular strap portion 15 is provided intermediate the feet for surrounding the bearing unit 11.

As shown in FIG. 2 the strap portion 15 of the pillow block housing has a concave segmental spherical inner annular wall 16 with transverse slots or grooves 17, 17 (FIG. 1) on diametrically opposite sides thereof to receive the sealed bearing unit 11 as a unit. This sealed bearing unit 11 is adapted to fit in a horizontal position through the grooves 17, 17 and then tilted 90° into vertical position for seating on the concave wall 16 in retained mounted but tiltable position therein.

The sealed bearing unit 11 includes an outer race ring 18 with a convex segmental spherical outer bearing wall 19 seated on the inner concave bearing wall 16 of the strap 15. An internal annular groove 20 is formed around the inner face of the race ring 18 to provide an outer raceway for a ring of ball bearings 21.

An inner race ring 22 is nested within the outer race ring 18 but extends on both sides beyond the outer race ring. This inner race ring 22 has an external annular groove 23 therearound providing an inner raceway for the ring of ball bearings 21. The outer race ring 18 carries flexible seal rings 24 spanning the space between the outer ring 18 and the inner ring 22 and having inner peripheral lips 24a riding on the outer periphery of the inner race ring 22. Metal retainer rings 25 are snapped into grooves in the outer race ring 18 to secure the seal rings 24 in fixed position in the outer race ring. A sealed chamber C is thereby provided for the ring of ball bearings 21 between the outer and inner race rings.

The strap portion 15 of the pillow block housing 10, as best shown in FIG. 2, has a tapped hole 26 therethrough receiving a grease fitting 27. Grease from the fitting 27 is fed through the hole 26 to an external groove 28 around the outer periphery of the outer race ring 18 and thence through bores 29 into the chamber C for lubricating the ball bearings 21.

The inner race ring 22 is composed of relatively ductile high carbon chrome steel such as S.A.E. 52100 of about the following analysis:

| | |
|---|---|
| Carbon | .95 to 1.1%. |
| Manganese | .2 to .5%. |
| Phosphorus | .03%. |
| Sulfur | .035%. |
| Chromium | 1.2 to 1.5%. |
| Iron | balance. |

The shaft 12 inserted through the inner race ring 22 is generally composed of a low carbon mild steel but of course can be any type of metal suitable for shafting.

The inner race ring 22 is locally hardened through a band area 30 surrounding the ball race 23. This local hardening is easily accomplished by surrounding the raceway portion 23 of the race ring 22 with high frequency low voltage electric current inductors. When these inductors are positioned in closely spaced relation from the wall of the groove 23 eddy currents are induced in the surface of the race ring and since this ring is composed of magnetic material electric energy is dissipated in heat by hysteresis. The high frequency heat induced in the raceway area 23 quickly raises the area to a point of decalescence whereupon the hysteresis effect become negligible and further heating is by the eddy currents alone.

The race ring 22 is preferably rotated or oscillated in the inductors to distribute the heat and as soon as the area 30 has been heated to a quench hardening temperature, it is immediately quenched by water, oil, or the like. Thereupon the hard band area 30 is locally formed and cushioned in the soft ductile main body portion 31 of the race ring 22.

In accordance with this invention one extended end portion of the ductile body 31 of the race ring 22 is lathe cut or otherwise machined to provide an eccentric external ring or band 32. This band is shown in FIGS. 2 and 3, provides a thin cross section 33 displaced 180° from the full thickness portion 34 of the inner race ring and the eccentricity from the thin portion 33 to the thick portion 34 is uniform.

The eccentric band 32 is externally grooved to provide a very shallow tapered recess 35 therearound.

The locking collar 13 is composed of a mild steel generally of the same type as the shaft 12. This locking collar 13 is in the form of a ring having a concentric bore 36 therethrough sized to receive the shaft 12 in an easy slip fit relation. One end of the bore 36 is counterbored to provide an eccentric bore 37 and a radial shoulder 38. The eccentric counterbore 37 preferably has a local internal bead 39 for fitting the recess 35.

The counterbore 37 of the locking collar 13 and the end portion 32 of the inner race ring 22 are both machined to act as mating cams when mounted on the shaft 12.

As shown in FIG. 2 the shaft 12 has an easy slip fit through the inner race ring 22. Likewise, the collar 13 has an easy slip fit on the shaft 12. The collar is placed on the shaft with its cam counterbore 37 adjacent the cam end 32 of the race ring 22. In this free position the bore 36 of the locking collar 13 is concentric with the bore 40 of the race ring 22. When the collar 13 is rotated on the shaft 12 in the direction of shaft rotation, the eccentric counterbore 37 will eventually mate with the eccentric end portion 32 to permit the lip 39 to ride over the end 32 into alignment with the recess 35 whereupon continued rotation of the locking collar will move the counterbore 37 into eccentric relation with the end 32 thereby causing the race ring 22 to be clamped to the shaft as shown in FIG. 3. As therein shown the collar 13 is rotated 180° from the position shown in FIG. 2. To effect this rotation a spanner wrench 41 with an arcuate portion 42 surrounding the shaft 12 and a laterally extending lug 43 seated in a hole 44 in the outer end face of the locking collar can easily rock the locking collar into its clamping position thereby moving the bore 36 tightly against the top of the shaft and moving the counterbore 37 tightly against the bottom of the band area 32 to actually deform this ductile area at the thin portion 33 thereof into tight clamping relation with the shaft along an area 45. This is further illustrated in FIG. 4 where the counterbore 37 and its lip 39 are shown as wedging against the thin portion 33 of the end 32 along the bottom half of this end while the bore 36 is tightly seated against the top half of the shaft but the top thicker portion 34 of the race ring is actually spaced from the top of the shaft. The clamping action therefore occurs between the top half of the bore 36 and the bottom half of the counterbore 37. Deformation occurs along an area 45 designated between the arrow heads in FIG. 4.

As shown in FIG. 3 the deformation 45 only occurs at the ductile end or band 32 while the main body 22 of the inner race ring remains concentric to the shaft 12.

In contrast as shown in FIGS. 6 and 7, the prior art with a through hardened inner race ring 22a when fitted with the conventional prior art locking collar 13a would not be deformed by the locking collar and the clamping action occurring between the concentric bore 36a engaging the bottom half of the shaft 12 as shown in FIG. 6 and the eccentric bore 37a engaging the top half of the band area 32a causes a tilting or cocking of the inner race ring 22a on the shaft 12. Then when the shaft and inner race ring are rotated 180° as shown in FIG. 7 a reverse cocking effect takes place so that in operation a continual oscillation or vibration of the inner race ring 22a on the shaft 12 will be set up. These vibratory impacts create the corrosive fretting action mentioned hereinabove and soon wear down a reduced diameter area 12a of the shaft as shown in FIG. 8. Since the race ring 22a is usually composed of hardened high carbon steel while the shaft 12 is usually composed of a mild steel, the two metals have slightly different electromotive forces which are sufficient to set up a battery-like corrosive action causing the oxidation or rusting of the softer metal and the quick wear down of the shaft to an undersized unfit condition. As the shaft decreases in size, of course, the vibratory impacts increase in magnitude and destruction is accelerated.

Further the ring band area 32a of the through hardened inner race ring 22a is also subjected to these vibratory impacts and is placed under excessive stress loads. These loads soon fatigue the hardened metal at the band area especially at the thin section 33a thereof and cracks are formed therein resulting in cleavage of the band end 32a from the rest of the ring body and complete failure of the lock.

As shown in FIG. 9 on the other hand, the local deformed area 45 of the inner race ring 22 of this invention does not in any way cock or tilt the race ring on the shaft and no corrosive fretting or vibratory impacts will occur.

Further the soft band area 32 of the inner ring 22 of this invention will not break off from the main body of the ring.

If desired the locking collar 13 can be internally tapped to receive a set screw 46 which will bite into the shaft 12 when tightened for holding the locking collar in its clamped position. However since, as explained above, the locking collar moves to its gripping position in the same direction as the rotation of the shaft 12, the rotation of the shaft normally keeps the collar in its locked position and the set screw is not necessary.

In the arrangement shown in FIGS. 10 to 13, the inner race ring 47 is through hardened along its main body portion 48 thereof but one end 49 is annealed to a soft ductile condition. This end 49 is eccentrically counterbored to provide a concave eccentric inner wall 50 and a radial shoulder 51.

The main bore 52 of the inner race ring 47 is concentric with the shaft 12 while the convex portion 50 is eccentric relative to this main bore 52 having a deep portion at the top of the race ring 47 and a shallow portion at the bottom of the race ring as viewed in FIG. 10.

A split internal locking ring or collar 53 of hardened steel has an internal cylindrical bore 54 sized to fit freely over the shaft 12. The split end of the collar or ring 53 provides a contracting gap 55 adapting the ring to be easily contracted for fitting in the eccentric counterbore 50 before the race ring 47 is mounted on the shaft. This assembly of collar 53 and race ring 47 is preferably made at the factory so that the assembled lock and bearings are sold as a complete unit.

The external periphery 56 of the ring 53 is convex to fit in the concave counterbore 50 and has an eccentricity of the same order as the counterbore 50.

In assembly, the race ring 47 with the locking ring 53 in the counterbored end 49 positioned in concentric relation with the main bore 52 of the race ring fits freely on the shaft 12 and is slipped to its station on the shaft.

A dimple or recess is provided on the outer face of the ring 53 to receive a spanner wrench similar to the wrench 41 described in FIG. 2 and the ring 53 is then rotated in the counterbore 50 from the unlocked concentric position of FIGS. 10 and 11 to the locked position of FIGS. 12 and 13. This rotation moves the external periphery 56 of the ring 53 into eccentric relation with the counterbore thereby gripping the counterbore and first bottoming the main bore 52 of the race ring 47 against the top portion of the shaft 12 as shown by comparison of FIGS. 10 and 12. Next the continued rotation of the ring 53 wedges against the counterbore 50 and deforms the end 49 outwardly at 58 as shown in FIG. 12. The unhardened end 49 absorbs all of the deformation 58 and the hardened main body 48 of the race ring is not deformed and is therefore not cocked on the shaft 12.

The radial shoulder 51 of the counterbore 50 is spaced from the ring 53 so that the ring can tilt in the counterbore 50 to accommodate any misalignments when the ring 53 is bottomed on the shaft 12.

As shown by the relative positions of the dimple 57 in FIGS. 11 and 13, fully locked position is achieved by a relatively small degree of rotation of the ring 53 but this degree of rotation will vary in accordance with variations in shaft diameter and counterbore diameter since the eccentric ring 53 is capable of effecting secure locking of the race ring on the shaft throughout a wide range of variations in shaft and counterbore diameters.

In the modification of FIGS. 14 and 15, a modified internal locking collar or ring 60 is provided to secure the race ring 47 to the shaft 12 and parts identical with parts described in FIGS. 10 to 13 have been marked with the same reference numerals.

As shown in FIG. 14, the modified internal locking ring 60 includes a portion 61 which is the same as the ring 53 of FIGS. 10 to 13 but this portion is integral with a head 62 that extends therefrom beyond the race ring 47.

As shown in FIG. 15, the modified ring 60 is split and has a contracting gap 63. The bore 64 of the portion 61 is bottomed on the shaft 12 while the head 62 has a larger bore 65 spaced outwardly from the shaft. The head has a recess or dimple 66 for receiving the spanner wrench 41 and also has a plurality of lug wrench receiving recesses or notches 67 in spaced relation around the periphery thereof. The head portion 62 therefore can be easily reached and gripped by any suitable type of turning wrench.

The modified locking ring or collar 60 has the portion 61 snapped into the counterbore 50 of the race ring 47 at the factory so the complete assembly is ready for easy installation by merely sliding it on the shaft to its intended station with the eccentric portion 61 in concentric relation with the eccentric counterbore 50. Then the head 67 is gripped with a wrench and rotated to move the portion 61 into locked wedging eccentric relationship with the counterbore 50. The same deformation of the end 49 as described in FIG. 12 will also occur and the inner race ring will be securely locked on the shaft.

As shown in FIG. 14 the neck portion 68 which connects the portions 61 and 62 spaces the portion 62 outwardly from the end of the ring 47 so that the head 62 will not interfere with tilting of the ring in the counterbore for accommodating misalignments.

From the above descriptions it will be understood that this invention provides bearing assemblies with soft deformable end portions receiving either external or internal locking collars capable of deforming these end portions into localized gripping relation with an inserted shaft without, however, cocking, or, in any way, deforming the main body of the bearing. The locks of this invention avoid heretofore encountered vibratory impacts between the bearing and the shaft supported by the bearing.

We claim as our invention:
1. In a bearing assembly having inner and outer race rings with complementary ball races therein and ball elements seated in said races holding said race rings in concentric spaced apart relatively rotatable relation, a housing supporting the outer race ring and a shaft extending through the inner race ring, the improvement of said inner race ring having the ball race thereof defined by an integral locally hardened raceway portion spaced from one end of said inner race ring, an integral ductile portion extending from said hardened raceway portion to said one end and an integral deformable band area formed in said ductile portion adjacent said one end and spaced from said hardened raceway portion, said ductile portion between said hardened raceway portion and said deformable band area being effective to prevent displacement of the hardened raceway portion when the band area is deformed, said band area being in eccentric relation to the main bore of the inner race ring, and a locking collar on said shaft of lesser ductility than said ductile portion of said inner race ring and having a bore concentric with the shaft and a portion eccentric with said bore engaging said eccentric band area of the inner race ring whereby rotation of the locking collar on the shaft and band area will deform the band area into light gripping relationship with the shaft without tilting the inner race ring on the shaft.

2. In a bearing assembly including a bearing mounting having a concave inner bearing face, an internally grooved outer race ring having a convex outer face tiltably mounted on the concave face of said mounting, an externally grooved inner race ring in said outer race ring, ball bearings riding in said grooves of the race rings holding the rings in rotatable axially fixed relation and a shaft extending through the inner race ring in freely fitting relation, the improvements of said inner race ring having a hardened raceway portion for the ball elements spaced from one end of the inner race ring, an integral ductile portion extending from said hardened raceway portion to said one end and an integral deformable band area formed in said ductile portion adjacent said one end and in spaced relation from said hardened raceway portion, said band area being in eccentric relation to the main bore of the inner race ring, a locking collar on said shaft of lesser ductility than said ductile portion of said inner race ring having a bore concentric with and riding on the shaft and a portion eccentric with said bore engaging the eccentric band area of the ductile portion of the inner race ring so that upon rotation of the locking collar relative to the inner race ring the band area will be deformed into tight gripping relationship with the shaft without tilting the race ring on the shaft, and means for rotating the collar relative to the race ring.

3. In a bearing assembly having an inner race ring receiving a shaft freely therethrough, the improvement of a ductile extended end portion on said inner race ring, said ductile end portion having a band area thereof eccentric to the shaft receiving bore of the inner race ring, a locking collar having a first bore receiving said shaft freely therethrough and a second bore in eccentric relation therewith adapted to mate with the eccentric band area of said ductile end portion, said eccentric band area having a recess therearound and said locking collar having a wedging bead projecting inwardly from said second bore and received in said recess, and means for rotating said locking collar on said shaft to cam lock the bead in the recess to wedge lock a portion of the bore of the locking collar with the shaft and to wedge lock a portion of the counterbore of the locking collar with the band area of said ductile end portion, said band area of said ductile end portion deforming under the wedging and camming action of said locking collar without tilting the race ring on the shaft.

4. In a bearing assembly, an inner race ring having a main bore adapted to receive a shaft freely therethrough, an external groove around said inner race ring, a zone hardened area surrounding said external groove, said inner race ring having a main body portion of soft ductile metal having a thickness corresponding to the thickness of the zone hardened area surrounding the external groove for at least a major portion of the extent of said main body portion on each side of said zone hardened area to cushion said zone hardened area, and an eccentric surface on an end of said ductile main body portion of the inner race ring adapted to be deformed under cam load into gripping engagement with the shaft freely received in the bore of the race ring without deformation of the ductile main body portion immediately adjacent the zone hardened area and without cocking the race ring on the shaft.

5. An inner race ring for a bearing assembly comprising a metal tube having a concentric bore therethrough, a peripheral groove therearound, and a localized hardened band area surrounding said peripheral groove, the improvement of a ductile portion on said tube extending from at least one side of the localized hardened band area to an end of said tube and an eccentric cam surface at said end of said tube spaced from said localized hardened band area to prevent transmission of stress to said localized hardened band area, said eccentric cam surface being engageable by a camming collar thereby to be deformed into clamping engagement with a shaft seated freely through the concentric bore of the tube by rotation of the camming collar without tilting the tube on the shaft.

6. An inner race ring construction for a bearing assembly which comprises a metal tube, a peripheral groove around said tube, a locally hardened band area surrounding said peripheral groove, a ductile portion extending from at least one side of said locally hardened band area to an end of said tube, an eccentric band area on said ductile portion at said end of said tube, said eccentric band area being spaced from said locally hardened band area by a distance such as to insure the cushioning of said locally hardened band area from stresses exerted on said eccentric band area, a shallow groove in said eccentric band area extending continuously therearound and said eccentric band area being deformable into gripping engagement with a shaft inserted through the tube without tilting the tube on the shaft so that the major portion of the tube is coaxial with the shaft.

7. In a bearing assembly having an inner race ring receiving a shaft freely therethrough, said inner race ring having an extended ductile end portion, a counterbore in said extended ductile end portion of the race ring in eccentric relation to the bore of the race ring, a locking ring split to define a narrow slot therethrough in its unstressed condition and freely disposed around said shaft, said locking ring having a cylindrical inner periphery for engaging the shaft and an eccentric outer periphery for seating in the eccentric counterbore of said ductile end portion, and means for rotating said locking ring relative to said race ring, a relatively large angularly extending portion of the inner periphery of the locking ring being wedge locked against the shaft and a relatively large angularly extending portion of the eccentric outer periphery of the locking ring being wedge locked against the counterbore of the race ring upon rotation of said locking ring, and said portion of the counterbore of the race ring engaged by the outer periphery of said locking ring being adapted to be deformed only in the ductile end portion of the inner race ring immediately adjacent to the counterbore whereby to prevent tilting of the ring on the shaft.

8. An inner race ring and shaft assembly for a bearing comprising a cylindrical tube having a concentric bore, a shaft extending freely through said bore, said tube having a through hardened main body portion, an extended soft ductile portion extending from at least one side of said through hardened main body portion to an end of said tube, said soft ductile portion having a counterbore therein opening through said end and in eccentric relation to said main bore, a locking ring having a concentric bore on said shaft and an eccentric periphery adapted to mate with the counterbore, and means for rotating said locking ring to cam lock the eccentric periphery thereof against the counterbore and the concentric bore thereof against the shaft, said counterbore being spaced from the through hardened main body portion to cushion the main body portion against stresses exerted on the area of the ductile portion having said counterbore therein, said area of the ductile portion having said counterbore therein deforming under the cam lock load without tilting the race ring on the shaft.

9. An inner race ring for a bearing comprising a hard metal tube having a deformable extended end, a counterbore opening through said extended end in eccentric relation to the main bore of the tube, a split eccentric ring in said counterbore having an eccentric outer peripheral surface adapted to mate with the counterbore, and a cylindrical inner peripheral surface concentric with the shaft, and means accessible through said counterbore for rotating said split ring in said counterbore to deform the deformable end portion of the race ring for gripping the locking ring against the shaft without tilting the race ring relative to the shaft.

10. An inner race ring assembly for a bearing comprising a metal tube having a zone hardened bearing portion and an eccentrically counterbored ductile end portion, and a split eccentric ring in the counterbore of said end portion adapted to wedge against said counterbore and grip an inserted shaft to lock the shaft and tube together, said counterbore being spaced from the zone hardened bearing support portion to cushion the zone hardened bearing support portion against wedging stress and said split eccentric ring having a cylindrical inner periphery to dispose a predetermined angular portion thereof in gripping relation to the shaft.

11. In a bearing assembly, an inner race ring having a hardened bearing support portion and an eccentrically counterbored ductile end portion, a split eccentric locking collar in said end portion having an external periphery for gripping the counterbore and an internal periphery of cylindrical configuration, and means for relatively rotating the race ring and collar to lock the ring to the shaft while deforming the end portion without cocking the ring on the shaft, said internal periphery of said split eccentric locking collar grippingly engaging the shaft for a substantial annular distance therearound upon said rotation of the race ring.

12. In a bearing, an inner race ring having a counterbored end of concave contour in cross-section, a locking collar tiltable in said end having an outer periphery of convex contour in cross-section mating with the concave contour of the counter bore of said end, said collar having a shaft receiving bore in eccentric relation to said outer periphery of the collar and said counterbore to wedge the collar between the ring and a shaft extending through the ring when the collar is rotated relative to the ring for locking the ring on the shaft.

13. In a bearing assembly, an outer race ring having an inner raceway portion, an inner race ring having a hardened outer raceway portion, antifriction elements riding on said raceway portions between said inner and outer race rings, an integral ductile end portion on said inner race ring, a shaft-receiving bore through said hardened and ductile portions of said inner race ring, a band area formed in said ductile end portion in eccentric relation to said bore, and a locking collar adapted for fitting on a shaft in said bore in cam locking relation to said band area adapted to deform said band area under cam load without deforming the hardened raceway portion or cocking the race ring on a shaft in said bore.

14. In a bearing assembly, an outer race ring having an inner raceway portion, an inner race ring having a hardened outer raceway portion, a concentric shaft-receiving bore and a ductile end portion, antifriction elements riding on said inner and outer raceway portions, said ductile end of said inner race ring having a camming collar receiving cam area eccentric to said bore, and a camming collar adapted for fitting on a shaft in said bore to deform said cam area under cam load to avoid deformation of the hardened portion of said inner race ring and to avoid cocking of said inner race ring on a shaft in the bore thereof while effecting locking of the inner race ring to the shaft through said camming collar.

References Cited in the file of this patent

UNITED STATES PATENTS

| | | |
|---|---|---|
| 827,267 | Schmidt | July 31, 1906 |
| 987,106 | Blanton | Mar. 21, 1911 |
| 2,118,885 | Hughes | May 31, 1938 |
| 2,553,337 | Shafer | May 15, 1951 |
| 2,728,616 | Potter | Dec. 27, 1955 |